Aug. 13, 1940.                    N. GARRETT                    2,210,938
                APPARATUS FOR SOLVING MATHEMATICAL PROBLEMS
                    Filed Sept. 30, 1939          6 Sheets—Sheet 1
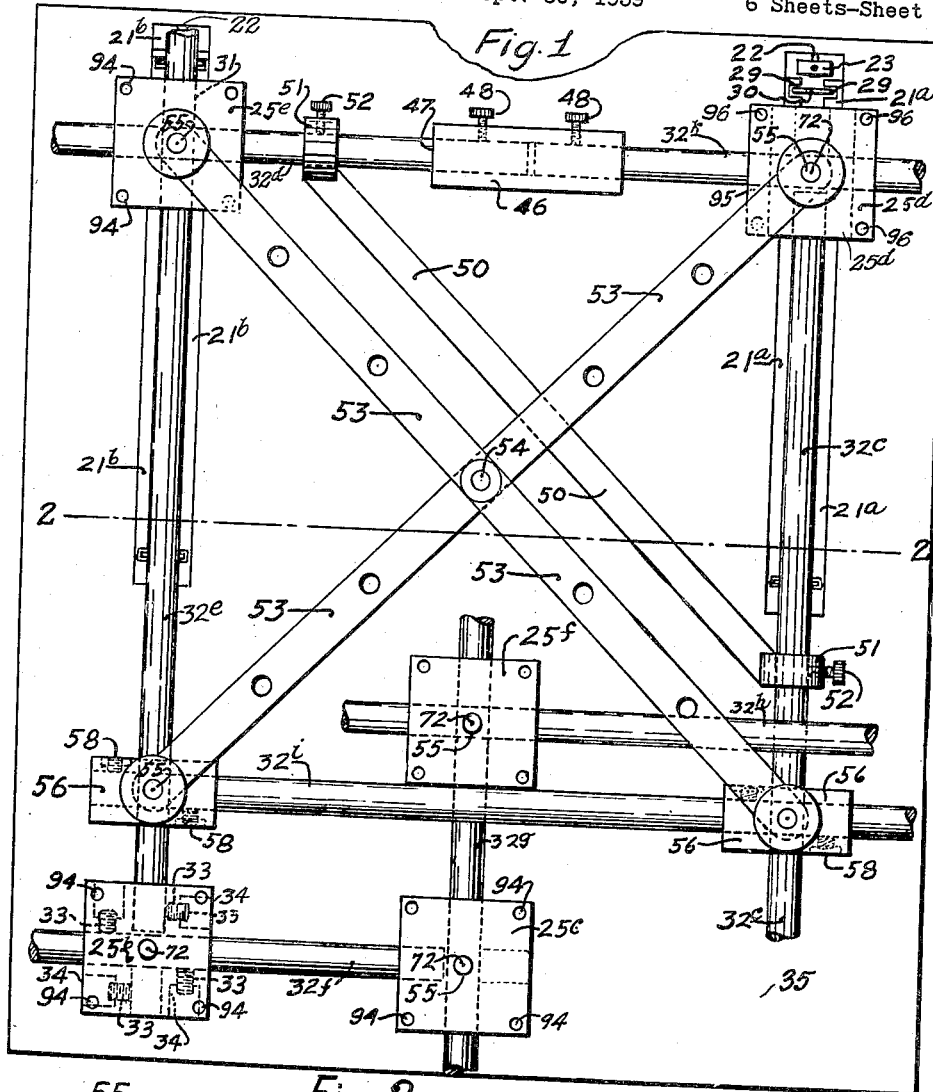
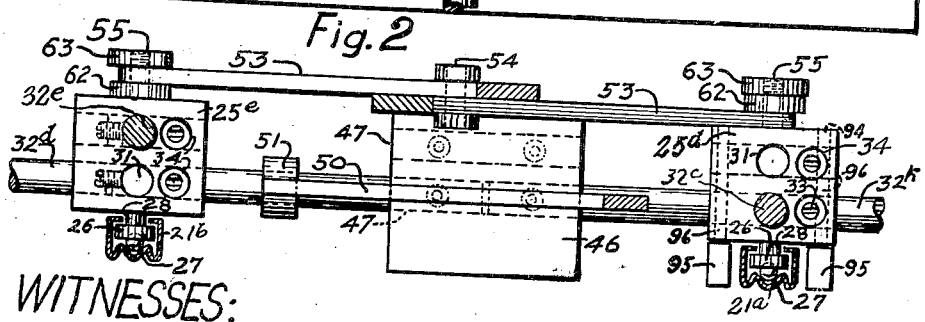
WITNESSES:
B.L. Griffing
A.P. Hopkins
INVENTOR
Neal Garrett Aug. 13, 1940.   N. GARRETT   2,210,938
APPARATUS FOR SOLVING MATHEMATICAL PROBLEMS
Filed Sept. 30, 1939   6 Sheets-Sheet 2
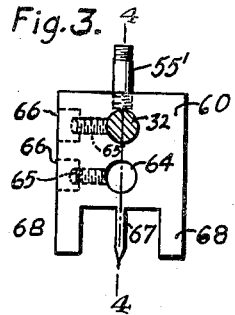
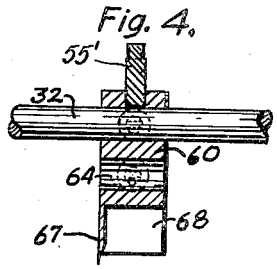
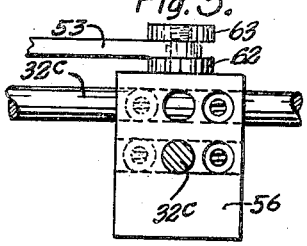
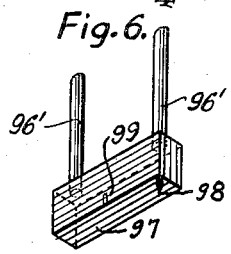
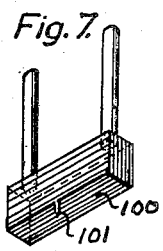
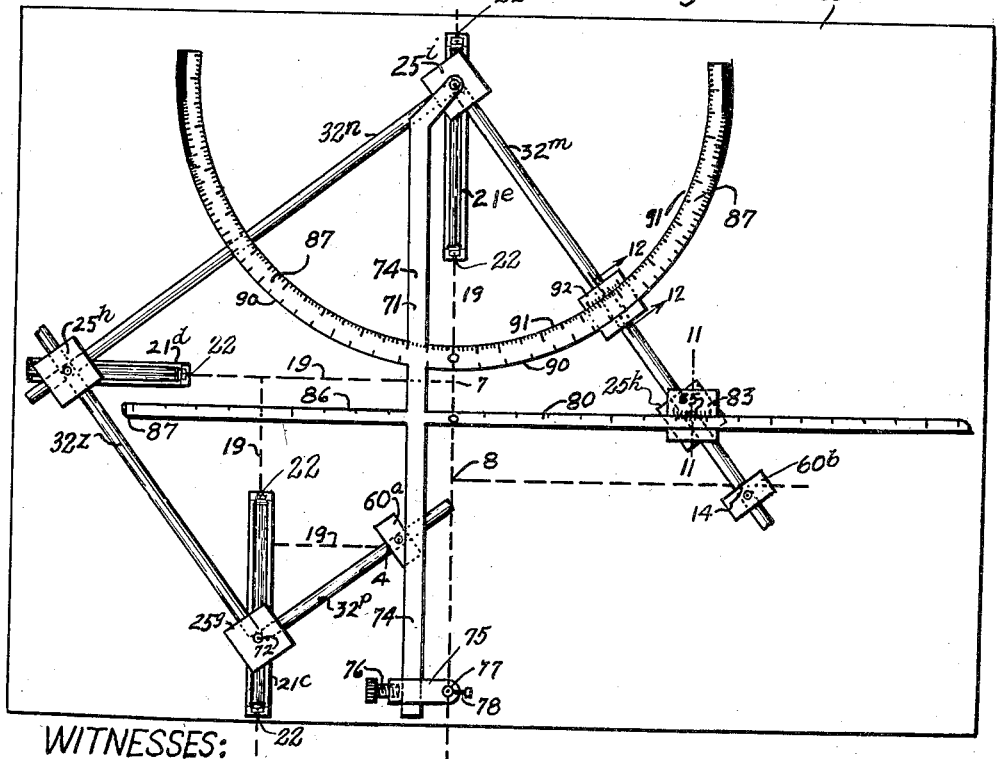
WITNESSES:
P. L. Griffing
L. P. Hopkins
INVENTOR
Neal Garrett.

Aug. 13, 1940.                N. GARRETT                2,210,938
APPARATUS FOR SOLVING MATHEMATICAL PROBLEMS
Filed Sept. 30, 1939         6 Sheets-Sheet 3
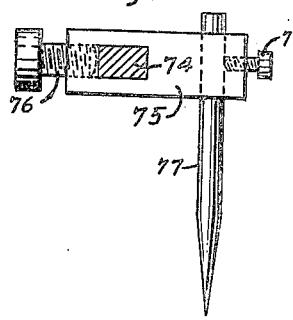
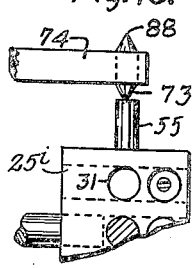
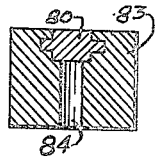
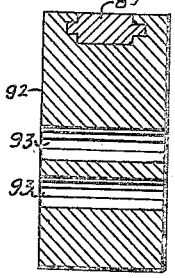
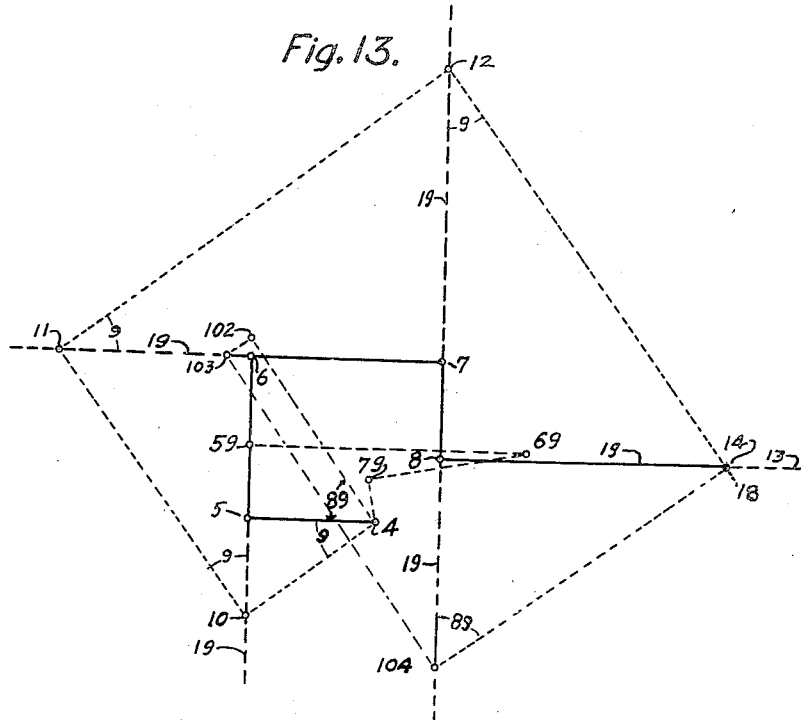
WITNESSES:
B. L. Griffing
L. A. Hopkins
INVENTOR
Neal Garrett.

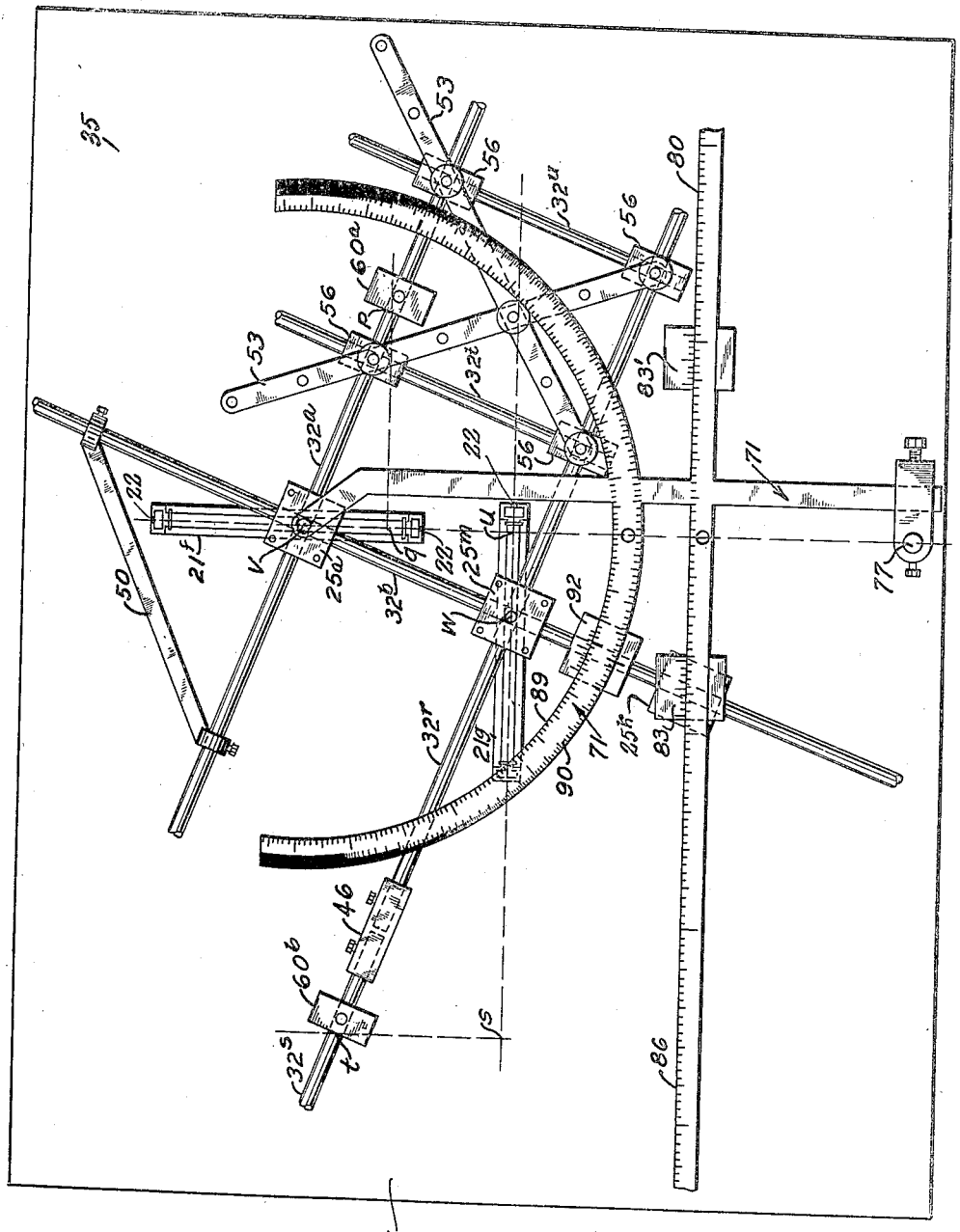

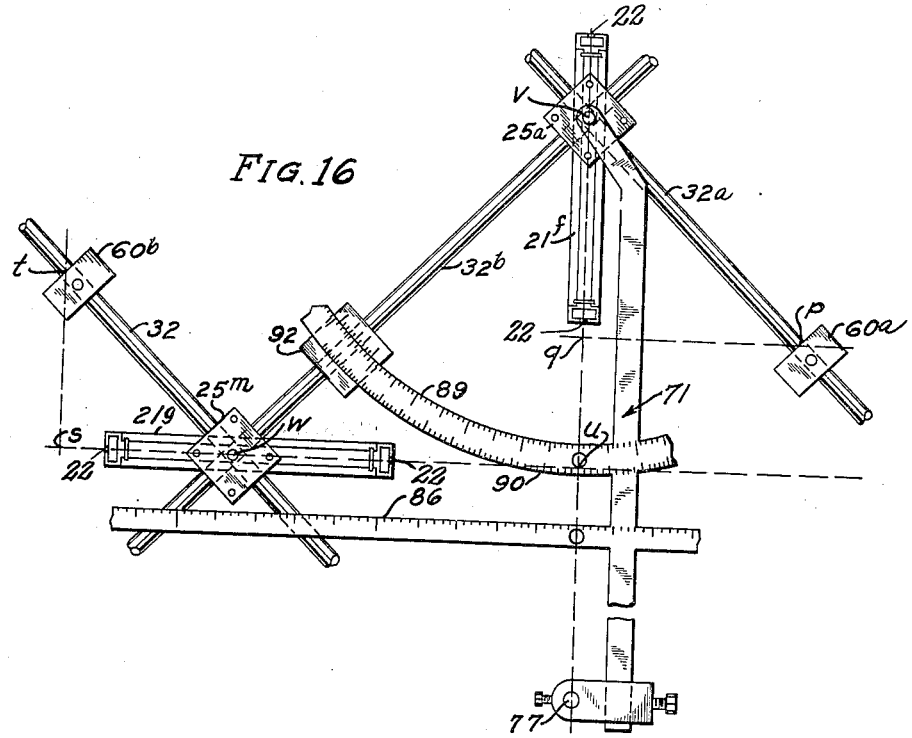
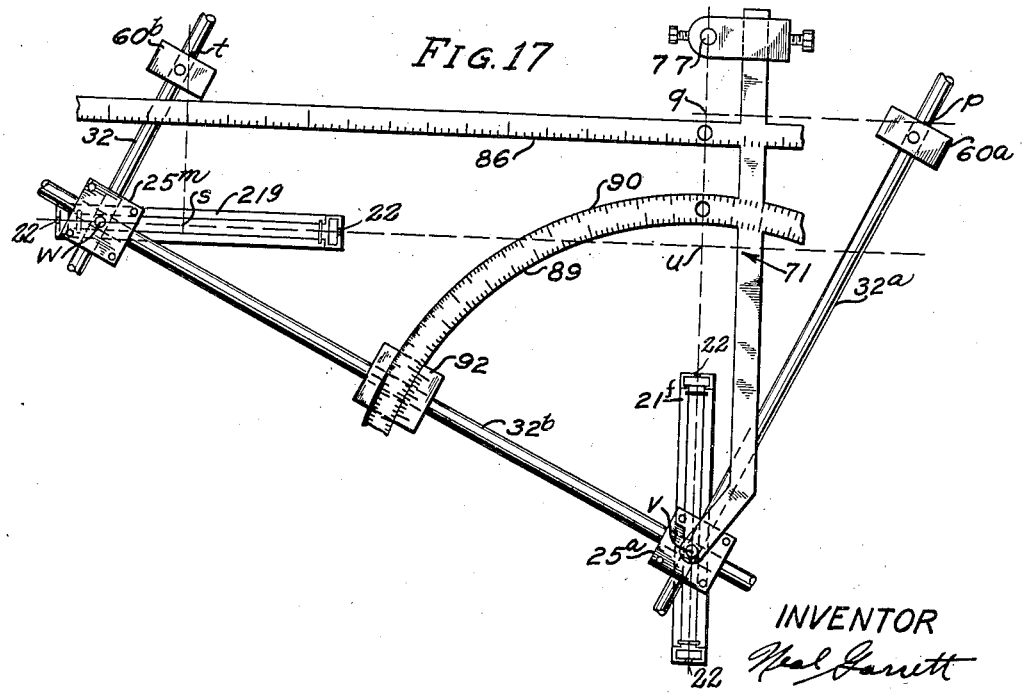

INVENTOR
Neal Garrett

Patented Aug. 13, 1940

2,210,938

UNITED STATES PATENT OFFICE 2,210,938

APPARATUS FOR SOLVING MATHEMATICAL PROBLEMS

Neal Garrett, Glendale, Calif.

Application September 30, 1939, Serial No. 297,322

25 Claims. (Cl. 235—61)

With the exception of this paragraph, this specification is a verbatim copy of the specification of application Serial No. 388,975, series of 1925, filed August 28, 1929, for Apparatus for solving mathematical problems as the same was amended in the application as the latter was scheduled to issue on July 25, 1939, before it was discovered that a mistake had been made by a failure on the part of the applicant to pay the final fee within the prescribed period of time for the payment of the same. This application relates to somewhat the same subject matter of invention and shows some of the same subject matter of invention as does applicant's copending application Serial No. 81,990, filed May 27, 1936, for Apparatus for use in solving mathematical problems. Division of the last mentioned application has been required. The claims of this application read on some of the species of the invention that must be divided out of application Serial No. 81,990 because of the requirement for division. For these reasons, the claims of this application that read on the disclosure of application Serial No. 81,990 are to bear a relationship to the last mentioned application like that which the claims of a divisional application bear to a parent application.

My invention relates to a novel apparatus for solving mathematical problems and especially to apparatus for use in determining the roots of any equation of any degree in terms containing one unknown.

Certain settings are made on the apparatus for certain terms of the equation. The apparatus has the property of adjusting itself so that one root of the equation may be read directly from the apparatus. A portion of the apparatus sets up the law of the equation and the setting of another portion of the apparatus on the first part causes the apparatus to be adjusted so as to give one root of the equation. The second part of the apparatus may be set in different positions, each of which gives one of the real roots of the equation. From the apparatus in the position of the setting for the first root, measurements for another setting of the first part of the apparatus may be taken and the second part of the apparatus set on the new setting and another root read directly from the apparatus. The second method of resetting the first part of the apparatus to determine each root is often quicker, and makes it very clear when there are imaginary roots. The method and apparatus does not give imaginary roots.

The objects of my invention are to provide apparatus for use in performing each and/or all operations mentioned in the preceding paragraph.

Some of the other objects of my invention are to reduce the labor connected with handling problems involving equations and/or polynomials; to provide mechanical means for solving equations simultaneously; and to provide an apparatus adapted to be set and/or moved in a manner to help one visualize algebraic statements.

There are many cases where it is desired to obtain a result from indications on several instruments, and where a rather complicated mathematical problem has to be solved in order to obtain the final result. There are cases where the time required to solve the problem is so great that the delayed answer is of much less value than an answer would be if it were obtained sooner after the time of the occurrence of the particular indications of the instruments. It is an object of my invention to provide means for obtaining the final result sooner in such cases. My apparatus may be arranged in the form for the solution of the problem in question. As soon as the indications are read upon the instruments, the corresponding settings may be made on my apparatus and the final result read directly from my apparatus.

One form of apparatus and the theory of operation thereof is illustrated in the accompanying drawings, in which Fig. 1 is a fragmentary plan view of most of the apparatus; Fig. 2, a vertical elevation of part of the apparatus shown in Fig. 1, cut on the line 2—2; Fig. 3, a vertical elevation of a pivot block; Fig. 4, a vertical section of the pivot block shown in Fig. 3, taken on the line 4—4; Fig. 5, a vertical elevation of one of the sliding members; Fig. 6, an isometric view of a corner pivot attachment for a corner member; Fig. 7, an isometric view of a central pivot attachment for a corner member; Fig. 8, a plan view of a portion of the apparatus set in position for the solution of a problem; Fig. 9, a view of the end of the orienting arm of the measuring apparatus, showing the apparatus for holding the orienting needle; Fig. 10, a portion of a side view of one of the corner blocks with the other end of the orienting arm in position; Fig. 11, a section through the scale and the vernier block taken on line 11—11 of Fig. 8, without any of the other apparatus showing; Fig. 12, a section of the protractor vernier block taken on line 12—12 of Fig. 8; Fig. 13, a diagram showing the theory of operation; Fig. 14, a diagram to serve as a guide in making settings of the apparatus for values of the coefficients of the variable; Fig. 15, a plan view of the apparatus and diagrams showing the operation and applications thereof and particularly showing the apparatus set to give one root of an equation; Fig. 16, a fragmentary plan view of apparatus shifted into a position to give another root of the equation for which the apparatus is set in Fig. 15; Fig. 17 is a fragmentary plan view of apparatus showing a setting thereof to give still a further root of the same equation for which the apparatus is set in Fig. 15; Fig. 18 is a fragmentary plan view of apparatus set from measurements obtained from the apparatus set as shown in Fig. 15 to give a root of the same equation; Fig. 19 is a fragmentary plan view of apparatus set from measurements taken from the apparatus as shown in Fig. 18 to give another root of the same equation; Fig. 20 is a diagram illustrating mathematical principles upon which the apparatus is based.

Mathematical problems are generally expressed as equations. In the solution of these equations the most difficult part of the work is to find the roots of an equation in terms of one unknown. Nearly all equations of the $n$th degree, in one unknown, may be written in the general form $$a_0x^n + a_1x^{n-1} + a_2x^{n-2} + \ldots + a_n = 0 \quad (A)$$

Where $n$ is a positive integer, $a_0, a_1, a_2, \ldots, a_n$ are independent of $x$, and $a_0$ does not equal zero.

My invention provides apparatus for determining the roots of equations included under this type. Such an equation has $n$ roots and no more, counting imaginary roots, but my method and apparatus does not give imaginary roots.

When $n=3$, the expression may be written in the form $$[(a_0x + a_1)x + a_2]x = -a_3 \quad (B)$$

When $n=4$, in the form $$\{[(a_0x + a_1)x + a_2]x + a_3\}x = -a_4 \quad (C)$$

It is convenient to write any expression in such a form for the purpose of considering the theory of my invention.

In Equation C, let $a_0=4$, $a_1=5$, $a_2=6$, $a_3=3$.

In Fig. 13, to a convenient scale, segments representing $a_0$, $a_1$, $a_2$, and $a_3$ are drawn in succession at right angles to one another and around in the clockwise direction, and are represented by segments 4—5, 5—6, 6—7, and 7—8. The lines of these segments will be called the track lines 19. The graphical steps described in this specification are for use in teaching the theory on which apparatus embodying my invention is based and it will hereinafter be made apparent that features of my invention can be used for mathematical calculations without using any of said graphical steps. The figures where track lines 19 are shown may be considered to be map-like diagrams, the track lines 19 being intended to represent positions of tracks or paths along which elements of apparatus are to be moved. The term "track line 19" is also used to refer to a line in a diagram that represents a position of a path along which the position of an element is to be determined or along which it may sometimes be convenient to move an element or determine the position of an element.

To clearly show the theory of operation of my invention the problem of evaluating the left hand side of Equation C is considered for a value of $x$ equal to ¾. The angle 9 is constructed whose tangent is $x$ with its vertex at point 4. This angle cuts off the segment 10—5 on the elongation of the track line 5—6. Since 4—5 is $a_0$, this segment will be equal in magnitude to $a_0x$, which is the first term in Equation C. With point 10 as the vertex, the angle 9 is laid off from the track line 5—6 and intersects the next track line at point 11 and cuts off a segment 11—6 on the elongation of the track line 6—7. This segment 11—6 is $(a_0x + a_1)\tan 9$, which is $(a_0x + a_1)x$. This is more of Equation C. With point 11 as the vertex, angle 9 is laid off from track line 6—7 and intersects the extension of track line 7—8 at point 12, determining segment 7—12, which by construction is equal to $[(a_0x + a_1)x + a_2]x$. Through 8, draw line 8—13 perpendicular to line 8—12. With point 12 as a vertex, lay off angle 9 from track line 7—8. This angle will cut off segment 8—14 on line 8—13. By construction, segment 8—14 is equal to the left hand member of Equation C. In the construction, $x$ was taken as ¾, and the construction shows that if $x=¾$, segment $8—14 = 9 = -a_4$, and $a_4 = -9$. In an analogous manner, a figure may be made for any value of $x$. In any case it is evident that the angle 4, 10, 11; the angle 10, 11, 12; and the angle 11, 12, 14 are right angles. In considering the steps just described the track lines 5—6, 6—7, 7—8, and extensions thereof and track line 8—13 may be thought of as representing paths along each of which the position of an element is to be determined.

If $a_4$ is known and $x$ unknown, the equation when written in the form C is as follows:

$$\{[(4x^1 + 5x^0)x^1 + 6x^0]x^1 + 3\}x^1 = 9x^0 \quad (C')$$

and when written in the form A is as follows:

$$4x^4 + 5x^3 + 6x^2 + 3x^1 - 9x^0 = 0 \quad (I)$$

The segment $a_4$ should be laid off on the line 8—13, to the right if negative, and to the left if positive. As before, let point 14 be the extremity of the segment representing $a_4$. Try different values of $x$ and proceed as before. Let the line making the trial angle with 8—12 be 12—18. By the method of trial, the value of $x$ may be found which will make 12—18 pass through 14. This value of $x$ will be one root of the equation and will be designated by $r_1$. For some problems it is more convenient to start with 14 and hit the point 4. For each trial, when point 4 is started with, a line through 4—5 may be considered to represent the position of a path along which it is desired to determine the position of an element. For this reason such a line as 4—5 is referred to as a track line 19.

To proceed with the determination of another root, write the equation in the form $$\{[(a_0x + a_1)x + a_2]x + a_3\}x + a_4 = 0 \quad (D)$$

and divide by $(x - r_1)$ to get the following equation:

$$4x^3 + 8x^2 + 12x^1 + 12x^0 = 0 \quad (II)$$

Find a root of the new equation by the graphical method described and call it $r_2$. This graphical solution of Equation II is illustrated in Fig. 20. The segment 4—5 is used to represent the first coefficient as before. The segments 5—1, 1—2, and 2—3, being positive, are laid out in a clockwise direction to represent the track lines for the respective coefficients of the other descending powers of $x$. The broken line 4, 15, 16, 3 represents the figure that satisfies Equation II. As can be measured, the value of the tangent of the angle 5, 4, 15 is 1.393, which is the numerical value of a second root of Equation I. Whether or not this root is positive or negative can be readily seen by considering Equation II in the general form of Equation B, $a_0$ is represented by segment 4—5, $a_1$ by segment 5—1, $a_0x^1$ by segment 5—15, and $(a_0x^1+a)$ by segment 15—1. In this case $x$ has a negative value because it causes $a_0x^1$ to subtract from $a_1$. Therefore, if $r_2$ represents this root of Equation I, we have $$r_2 = -1.393.$$

Divide by $(x-r_2)$ and continue in a like manner until $n$ roots, or all real roots are found. Equation II divided by $x-(-1.393)$ becomes $$4x^2 + 2.428x^1 + 8.612x^0 = 0 \qquad \text{(III)}$$

Referring to Fig. 13, the track lines for the second degree equation are 4—5, 5—59, and 59—69. It is obvious that a right angle cannot be constructed with a vertex on track line 5—59 and pass through points 4 and 69. The right angle 4, 79, 69 is drawn to illustrate this condition. It is this condition that occurs when the roots are imaginary. In this case it will be noted that the discriminant, $(a_1^2 - 4a_0a_2)$, is less than zero, and that the roots would be imaginary if found by the algebraic method.

Division is not necessary in obtaining all roots of an equation. Any real root may be found on the first set of track lines 19 as laid out in Fig. 13. The construction for the second root is that illustrated by points 4, 102, 103, 104, and 14. The lines of this figure make a negative angle 89 with the track lines 19 which shows as before that $r_2$ is a negative root of the equation.

When division is used, it is preferable to use synthetic division, a rule for which is as follows: Using the same notation as in Equation A, "arrange terms in descending powers of $x$, supplying all missing powers by putting in zeros as coefficients. Write the first coefficient $a_0$; multiply $a_0$ by $r$, and add the product to $a_1$; multiply this sum by $r$, and add the product to $a_2$. Continue this process; the last sum is the remainder, and the preceding sums are the coefficients of the powers of $x$ in the quotient, arranged in descending order." In other words, the coefficients of the powers of $x$ in the quotient are $a_0$, $a_0r_1+a_1$, $(a_0r_1+a_1)r_1+a_2$,
$[(a_0r_1+a_1)r_1+a_2]r_1+a_3$ etc., which terms were previously shown by construction in Fig. 13 to be in magnitude equal to the segments 4—5, 10—6, 11—7, and 12—8, respectively. It is much more convenient to scale these off the drawing than to perform the division. Therefore, no algebraic operations are necessary in obtaining all the roots of an equation.

It will be noticed that the coefficient of the highest power of $x$ remains the same in determining each root. For this reason it is advisable to use the coefficient of the highest power of $x$ in the same position on the paper and lay the other values from it in a clockwise manner, if all are positive. When one becomes familiar with this method of solving problems he will not be confused by the fact that negative coefficients are scaled in the opposite directions, so that they subtract in this process instead of add. When zero coefficients are used, lines are drawn through the points but no dimensions are laid off. When one becomes familiar with this method of solving problems, it is not necessary to put the equations in forms similar to those shown in (B), (C), and (D). They will be more easily handled in the general form (A).

In general, the apparatus for solving these problems consists of a structure to take the place of the trial figure. The requirements of the apparatus to solve the problem previously illustrated with reference to Fig. 13 are that it be pivoted at the starting points 4 and 14; maintain the lines 4—10, 10—11, 11—12, and 12—14; keep the angles between these lines right angles; and be so that points 10, 11, and 12 will slide along lines 5—6, 6—7, and 7—12, respectively. It is to be preferred that the structure be provided with a means for measuring the angle 9. It is to be preferred that the structure be so flexible that it will fit any type of figure. Such a construction as this is shown in Fig. 8.

Referring to the drawings, tracks 21 are formed of sheet metal as shown in Fig. 2. The respective, identical tracks 21 are exponentially distinguished for facility in identification by reference characters 21a, 21b, 21c, etc. They are generally referred to as "tracks 21". At each end of the tracks 21 the upper portion of the sheet metal is cut away and each end of the tracks 21 is provided with marks 22. In the upper right-hand portion of Fig. 1, the position of one of the marks 22 is represented by the two short lines extending longitudinally of the track 21a and between the tack 23 and the extremity of the piece of metal that provides the track 21a. It is preferable to provide a mark 22 at both ends of each track 21 as is shown in Fig. 8. Each mark 22 is preferably in the form of an engraved line in the piece of metal that provides the track 21. Just back of marks 22 are tacks 23. In Fig. 8 these tracks are shown positioned so that the marks 22 are directly over the track lines 19. The tracks 21 are tacked on the base 35. In Fig. 8 the tracks 21 are shown in place on a figure of the same shape as that shown in Fig. 13.

The elements which are adapted to move along track lines 19 are corner members 25. The respective, identical corner members 25 are exponentially distinguished for facility in identification by reference characters 25a, 25b, 25c, etc. They are generally referred to as "corner members 25."

It is hereinafter set forth that, together with special attachments, corner members 25 may be used to provide a pivot at such points as points 4 and 14 of such a diagram as that shown in Figures 8 and 13. For any change in the value of $a_0$ or the constant term of an equation a corresponding change along a respective track line is made of the position of a part at point 4 or at point 14, respectively. In other words, the parts to be used at the starting or pivot points are to be considered as members for movement along track lines when handling a problem wherein just the terms of the equation or polynomial are to be varied that affect the spacings along the track lines on which the pivot points are thought of as being disposed. The corner members 25 shown in Fig. 8 are thought of as being for movement, respectively, along the respective three intermediate track lines of Fig. 8. The center line of each track 21 and the track lines 19 on which the track is placed is thought of as being one and the same line. The lines 19 indicate relative positions of paths for movement of parts of the apparatus. For the solution of a large number of problems it is preferable that a special relative positioning of the paths be set up for use in solving each problem. One way of providing such a set-up of paths is to arrange the tracks in the desired space relationship without drawing any lines. Even if the latter is done, the operator may think of the theoretical center lines of the tracks and extensions thereof as track lines and the same, together with the thoretical perpendicular to the first of the tracks through the first of the pivot points and the perpendicular to the last of the tracks through the other pivot point, as a set of track lines 19 such as is shown in Fig. 8. The bases of corner members 25 are provided with projections 26. The projections 26 are shaped to fit over ball bearings 27. This portion of the apparatus is assembled as shown in Fig. 2. Corner members 25 are adapted to roll on ball bearings 27 in grooves of track members 21. It is sometimes desirable to have track members 21 stay assembled with the corner members 25. This is accomplished with respect to vertical motion by providing grooves 28 around each projection 26 and shaping each track member 21 so that the edges will fit into this groove. In order to keep each projection 26 and each ball bearing 27 from slipping out at the ends of track members 21, slots 29 are cut through the edges of the corrugations of track members 21 and pieces of sheet metal 30 are dropped into slots 29.

Corner members 25 are provided with holes 31 which are at right angles and on two levels. Through these holes are placed rods 32. The respective, identical rods 32 are exponentially distinguished by reference characters $32^a$, $32^b$, $32^c$, etc. They are generally referred to as "rods 32." Rods 32 may be allowed to slip freely through these holes 31 or any one thereof may be fastened by tightening the proper one of the set screws 33. Holes 34 are provided for the purpose of keeping set screws 33 from projecting upon the surface of corner members 25. This makes it possible for the screws 33 to be out of the way of offering any obstruction to the bringing of a pair of parts such as corner members $25^b$ and $25^c$ tightly together.

In Figures 1, 2, and 8, rods $32^c$ and $32^k$ enter the lower holes in corner member $25^d$. It is convenient to tighten set screws 33 which come against rods $32^c$ and $32^k$ in corner member $25^d$.

Referring to Figures 1 and 2, rod $32^d$ is an extension of rod $32^k$ on the same level. Rod $32^d$ passes through the lower hole of corner member $25^e$ and is allowed to slide freely in this corner member. In order to miss rod $32^d$, rod $32^e$ passes through the upper hole in corner member $25^e$, and is allowed to slide freely in corner member $25^e$. Rods $32^e$ and $32^f$ enter the upper holes in corner member $25^b$ and are fastened by means of set screws 33 in corner member $25^b$. In Fig. 1, rod $32^f$ enters corner member $25^c$ on the upper level. Rod $32^g$ passes through corner member $25^c$ and corner member $25^f$ on the lower level. Rod $32^h$ passes through corner member $25^f$ on the upper level. It is best not to have spans too long between the corner members because the bars are apt to sag. When the spans are very long, it is better to use short bars and connect them by means of a splice member. In Figures 1 and 2, the splice member 46 is shown connecting rods $32^k$ and $32^d$. This splice member is provided with holes 47 adapted to receive rods 32 on each of the levels. Set screws 48 are provided for preventing the rods from sliding in the holes 47. Often it will be found necessary to change a bar from one level to another to keep it from interfering with some other part of the apparatus. A corner member may be used as a splice member.

The holes 31 may be machined very accurately in the corner blocks 25 so that for short spans the rods will be held very accurately at right angles to each other. For long spans it is necessary to have some type of bracing to keep rods 32 accurately at right angles or parallel to each other. Braces 50 are for this purpose. The ends 51 of brace 50 are shaped as shown. Each end 51 is provided with a hole adapted to receive a rod 32 at right angles to the direction at which the other end is adapted to receive another rod 32. The ends 51 of the braces 50 are provided with set screws 52 for the purpose of fixing them rigidly to such rods as rods $32^c$ and $32^d$ shown in Fig. 1. To make a right angle between intersecting rods 32, it is necessary to fix them rigidly in a corner member 25 by means of set screws 33 and then hold them in an accurate right angle and tighten the set screws 52 in the ends 51 of the brace 50. Fig. 1 shows that the right angle between rod $32^c$ and the member comprised of rods $32^k$ and $32^d$ is maintained by this method.

In Fig. 1, the rod $32^e$ is held parallel to rod $32^c$ and consequently perpendicular to rods $32^d$ and $32^k$ by means of the slidable parallel brace which is comprised of bars 53, connected in the middle by pin 54, and provided with holes at their ends which slip over pivot axles 55 which extend from the top of corner members 25 and sliding members 56. The connection of bars 53 at the center by the pin 54 constructed so that there is as little play as possible and still allow bars 53 to rotate about pin 54.

An elevation of the sliding member 56, which slides along rod $32^c$, is shown in Fig. 5. The sliding members 56 are very similar in construction to corner members 25. They are provided with holes on both levels which are perpendicular to each other. In Fig. 1, the sliding member 56 which is on bar $32^e$, has a rod $32^l$ held in one of the holes on the upper level by one of set screws 58. Rod $32^l$ passes through the other sliding member on the upper level and serves the purpose of holding the axle 55 of this sliding member 56 in a plane perpendicular to that on which the track lines 19 are drawn.

Figures 3 and 4 show the construction of pivot block 60 and the construction of a pivot axle 55', which is identical to the construction of pivot axle 55.

Since the bars 53 are on different levels, it is necessary to use washers 62 as indicated in Fig. 2 and Fig. 5 where necessary. Washers 62 and bars 53 are kept from slipping off axles 55 by nuts 63, which are screwed on threads at the end of axles 55.

If the apparatus is assembled with each corner member 25 set over a ball bearing 27, on a track member 21; each corner member will be free to move in the direction of the track member 21, but the relative directional relationship of the rods will be maintained constant because each rod is constrained at right angles to the next consecutive rod. In working on a figure as shown in Fig. 13, pivot blocks $60^a$ and $60^b$ are used at points 4 and 14, respectively. The construction of these pivot blocks is identical with that of pivot block 60 shown in Figures 3 and 4. They are provided with holes 64 on both levels, and are provided with set screws 65 for the purpose of fixing their position on any of rods 32. Holes 66 are for the purpose of keeping set screws 65 from projecting from the surface of pivot blocks 60ᵃ and 60ᵇ. In line with one face of each pivot block 60ᵃ and 60ᵇ and directly over the center of the hole 64, is a needle 67. Each pivot block is also provided with legs 68 which are for the purpose of keeping the needle 67 vertical, and consequently directly under the axis of rod 32 when placed through one of the holes 64.

This part of the description relates to a specific example of a setting of the apparatus for the solution of a specific prolem and it is to be understood that many of the steps herein mentioned, especially the drawing of lines, need not always be taken in using my invention for performing mathematical calculations. For the special case now being considered, track members 21 are placed on three of track lines 19 as shown in Fig. 8. Although the apparatus is not always used with the diagram like that of Fig. 13, for purposes of illustration the setting of the apparatus with respect to a diagram like that of Fig. 13 is here described. Pivot block 60ᵃ is placed on rod 32ᵖ and its needle 67 is pressed into the paper or other material that provides the surface of the base 35 at point 4. The set screw is not tightened, so that rod 32ᵖ is free to slide through pivot block 60ᵃ. Block 60ᵇ is identical in construction to pivot block 60ᵃ. Through the lower hole in block 60ᵇ, rod 32ᵐ is passed and the needle 67 of block 60ᵇ is punched into the paper or other material that provides the surface of base 35 at point 14. When this is done, the rest of the figure automatically adjusts itself by the corner members sliding along the track members 21 so that the horizontal projection of the axis of the rods 32 makes a figure which is the same as the figure 4, 10, 11, 12, and 14, which was obtained by trial. To obtain the value of $x$ for the equation, it is only necessary to measure the tangent of the angle between the horizontal projection of the rod 32ᵐ and the track line 7—8. For some cases the operator may take as a useful and sufficient indication of the value of the unknown the tangential property of the position of one of the rods with respect to one of the tracks as it appears to him without using a scale and taking any measurements in standard units. In other words, he may just estimate a ratio which is the measure of one side in units of the other side of the triangle.

A very convenient apparatus for obtaining an accurate measurement of the tangent of the angle between the line of motion of one of the corner members and one of the rods is the measuring device 71, shown in Fig. 8. The top of each of pivot axles 55 are provided with holes 72. Fig. 10 shows the orienting point 73 at the end of the orienting arm 74 of the measuring device 71, fitting into a hole in the center of the top of the pivot axle 55 of the corner block 25ˡ. Other details of the measuring device 71 are shown in Figures 9, 11, and 12. The orienting arm 74 of the measuring device 71 is in the form of a rectangular bar, held parallel to track line 7—8 by means of the form 75 on needle 77 on the track line 7—8. The form 75 fits the arm 74 and is adapted to slide along the arm or be tightened to the arm at any position by the set screw 76. The needle 77 is held in the form 74 by the set screw 78. When the apparatus is oriented so that the orienting arm 74 is parallel to the track line 7—8, the scale 80 is perpendicular to the track line 7—8, the zero point of the scale is directly over the track line 7—8, and the edge of the scale 80 is just one unit below the center of the corner block 25ˡ on the scale to which the scale 80 is calibrated. A corner block 25ᵏ, identical in construction with the corner blocks 25, is positioned on the rod 32ᵐ and over its axle 55 is fitted the scale and vernier block 83, a second of which is shown in Fig. 11. This block 83 is adapted to rotate about the axle 55, because the axle 55 of the block just fits into the hole 84 of the scale and vernier block 83. The upper surface of scale and vernier block 83 is provided with a vernier 85 to make it possible to read the scale 80 more accurately. In the set-up shown in Fig. 8, the value of $x$ may be read directly from the vernier 85. The orienting rod 74 is offset from the track line 7—8 for the purpose of allowing the center of the vernier 85 to be brought directly over the track line 7—8. A similar scale 86 projects from the other side of the orienting rod 74 and is calibrated in the opposite direction. The same scale and vernier block 83 may be used on the scale 86. As shown in Fig. 15, a scale and vernier block 83' of the same construction as the scale and vernier block 83 is placed on the scale upon which reading is not being done. Although not shown in the drawing, a corner member 25 is used under the scale and vernier block 83' for the purpose of holding the block 83' high enough to hold the measuring device 71 in a plane parallel to that on which the track lines are drawn. The other side of the scales 86 and 87 is calibrated in a like manner so that the measuring device 71 may be turned over to make it possible for the vernier block to slide to the zero point for the measuring of small negative angles. Before turning it over, it is necessary to slip the vernier blocks off, take the form 75 off, and put them on again for the new position. In the position for measuring negative angles, the other orienting point 88 (shown in Fig. 10) will be positioned in a hole in the center of the top of an axle 55.

Scale 80 is only long enough to measure values of $x$ up to 1.6. It would be very unhandy to have a scale too long. For larger angles it is better to make the measurements on a form 87, which is in the shape of an arc, the center of the circle being at the orienting point 73 or 88. The circular scale 90 is calibrated to measure the tangent of the angle which is the value of $x$. It is not possible to use a vernier with this type of scale. The other side of the form 87 is the protractor 91, and is calibrated in degrees and minutes. A vertical sectional elevation of the protractor vernier block 92 is shown in Fig. 12. It is provided with two holes 93, which make it adapted to be slipped over any of the rods 32. The angle may be read very accurately on the vernier block 92 and the value of $x$ is a tangent of the angle read. This vernier block may be slipped on the negative side of the protractor for reading negative answers. The other side of the form 89 is calibrated in a similar manner so that measuring device 71 may be turned over for the purpose of measuring small negative angles. This apparatus is perfectly flexible and may be set on the track lines for nearly any function and when properly set, the answer is read directly from scale 80 or 90 and the value of the angle whose tangent is $x$ may be read directly from protractor 91.

This does not means that a lined figure like Fig. 13 has to be used in conjunction with the apparatus. To use the indicating device 74 in conjunction with the apparatus it is merely necessary to cause the same to be set so as to measure a function of the angular relationship between one of the tracks and one of the rods. Without the use of any lined diagram, the indicating device can be assembled with respect to the apparatus in a manner such as that shown in Figures 8 and 15 and placed so that the needle 77 will be in alinement with one of the center lines of the tracks such as the center line of the track 21c or 21f of Fig. 8 or 15, respectively.

Needle 77 can be raised so that it may swing clearly above the surface of the base 35 on which the apparatus is set; next the rest of the apparatus may be set for a position to give the solution of the problem; then the indicating device may be moved and use made of the needle 77 in bringing it in alinement with the center of the track under the orienting point 73, whereupon, the indicating device will be brought to a position to where the value of $x$ can be read directly. For the case just described, the indicating device is used as a measuring instrument in determining a function of the form of relationship between one of the tracks and one of the rods. In the case just mentioned the form 75 can be fixed with respect to the arm 74.

The indicating device can be used in another manner in which the set screw 76 is not tightened and the arm 74 is free to slide in form 75. Apparatus set as shown in Fig. 8 can be used for the solution of any finite number of 4th degree equations, within certain limits, without changing the position of track 21c nor the position of form 75 and needle 77. In this latter case the indicating device 71 is an instrument that at all times will give the value of the unknown of an equation for which the apparatus is set.

A scale provided with graduations is not essential to every embodiment of my invention. It is only a refinement. In the case of a slide rule the scales are the essence of the device. As contrasted with this, without the use of refined scales, my apparatus can be assembled and set for giving a useful indication of a result of a problem to as useful a degree of accuracy as is sometimes necessary in engineering work. An approximate indication of a result can sometimes be taken as an operator's estimation of the tangent of an angle between two elements of the apparatus as between a rod and one of the tracks.

In functions when any one of the coefficients is smaller than the width of the corner members, the apparatus must be used in a different manner. Instead of using the center of a corner member 25 as a point to slide along the track line, in this case it is advisable to use one of the corners of a corner member 25. In this case the dimensions will be small and it is possible to place the track members in such a manner that the desired corner stays directly over the track line when the figure is moved in the neighborhood of the correct value of $x$. A preferable way of doing this is to first remove any tacks 23 that would hinder the tracks, then manually shift the track parallel to the position of the track line so as to maintain the desired corner of the corner member directly over the track line. For consideration of special apparatus for the special case now being described reference is directed especially to Figures 1, 2, 6, and 7. The corner members 25 are provided with drill holes 94. Rectangular blocks 95 are provided with rods 96, adapted for slipping in holes 94 of corner members 25, as shown on corner member 25d. Blocks 95 serve the purpose of extending the edges of the corner members 25 to the surface on which the track lines are drawn. They make it easier to see that the desired edge is directly over the track line.

In some cases it might be necessary to use the point under one of the vertical edges of a corner member 25 as a pivot point. Fig. 6 shows an isometric view of corner pivot attachment 97 for a corner member. The construction is identical with that of one of the rectangular blocks 95 with the exception of the needle 98 at the corner. The rods 96' are identically the same as rods 96 that are shown by dotted lines in Fig. 2. Each rectangular block 95 is provided with a mark 99 as shown on corner pivot attachment 97. Whenever the corner system is used to fit a small dimension it is desirable to use the center system with as much of the rest of the apparatus as possible. By the center system is meant the system in which the corner members 25 are mounted in the regular manner on the track and are rotatable about a vertical axis through the center of each corner member. In the center system the position of each corner member is considered to be in vertical alinement with the center of the hole 72 in the top of axle 55.

Consider a special case where the apparatus is being successively assembled by starting with a setting of a pivot block and proceeding with the placing of a rod therethrough, the placing of a corner member on the rod, the mounting of a corner member on a track in accordance with the center system and that it is necessary to prepare for the setting of parts to take care of very small dimensions. A rod is placed through the last mentioned corner members are right angles to the other rod. A block attachment 95 is placed on a corner member and the latter is placed on the last rod. This should be done so that the mark 99 is directly under the axis of the rod and in alinement with a vertical face of the corner member. Where the block 95 is used it is best not to use a track. The block attachment 95 is adapted to support the corner member at the same elevation above the surface of the base as the corner members that are assembled with the tracks. The corner member, that is assembled with the block atachment 95 as just mentioned, is for being manually constrained so that the mark 99 in the middle of the side of the block 95 is maintained directly over a rectilinear guide such as a track line. The next rod to be set may be considered as spaced from a position where a rod is usually used an amount equal to one-half the width of a corner member. The next corner member to be set may be considered to have a vertical edge thereof that is in alinement with the face of the block attachment of the previously set corner member on which is contained the last mentioned mark 99, which vertical edge may be considered as a pivot point or as an element to be manually constrained to a rectilinear guide such as a track line. Any marks such as marks 99, corners, vertical edges such as the vertical edge just mentioned, or points such as the needle points 67, 98, and 101 are called markers because they are used to establish the position of a part of the apparatus with respect to other parts.

Fig. 7 is an isometric view of the central pivot attachment 100 for the corner member 25. This is similar in construction to the corner pivot attachment 97, with the exception that the needle 101 is not at the corner but in the position of the mark 99. This attachment 100, when placed on a corner member 25, makes it possible to use the corner member 25 as a pivot member.

It is to be understood that features of my invention are applicable for use in constructing simplified devices and that many of the parts of the apparatus herein described are not necessary in every embodiment of my invention. For example, an apparatus for solving algebraic problems may consist of just a portion of the apparatus shown in Fig. 8, such as that portion comprised of the base having thereon the tracks $21^e$, $21^d$, and $21^c$; the corner members $25^g$, $25^h$, and $25^i$ and the rods $32^z$ and $32^n$. In such a simplified apparatus the corner members $25^g$ and $25^i$ take the place of the pivot blocks. In such an apparatus the tracks may be considered to be rectilinear guides. The rods $32^z$ and $32^n$ may be thought of as being computing members. The corner members may be considered to be devices for movement along the guides for supporting the members for movement along the guides, and for use in establishing the positions of the intersections of the members with the guides. To use such an apparatus for the solution of a second degree equation in which the coefficient of the first power of $x$ is represented by the perpendicular distance between the center lines of the guides $21^e$ and $21^c$, the device $25^g$ is spaced from the center line of the track $21^d$ a distance to represent a value of the coefficient of the second power of the unknown in the equation and the device $21^i$ is spaced from the center line of track $21^d$ a distance to represent an absolute value of the constant term of the equation, whereupon an approximation of the tangential relationship of the computing members with respect to the guides may be observed or an accurate value thereof otherwise determined.

Consider the general type of algebraic expression as stated by the left hand side of Equation A. Referring to Fig. 14, in the setting of the tracks (or track lines) in the manner described, coefficients $a_0$, $a_1$, $a_2$, and $a_3$ are applied in the directions shown by the arrows $h$, $i$, $j$, and $m$, respectively when they are positive, and when any of said coefficients are negative, those coefficients are applied in a direction opposite to that indicated by their respective arrows. The formulas written on the arrows in Fig. 14 are for the exponents of $x$ in the respective terms whose respective coefficients are applied (when positive) in the direction of the respective arrows. In these formulas, $k$ may be zero or any positive integer. For the case when there are just the coefficients $a_0$, $a_1$, $a_2$, and $a_3$, if the value of $k$ be taken as zero, the formulas will give exponents of $n$, $n-1$, $n-2$, and $n-3$, respectively for the respective terms containing the respective coefficients. In algebraic expressions where $n$ is 4, 5, 6, or 7, the value of $k$ is first taken as zero to obtain the first four exponents, then as one until a zero exponent is obtained; where $n$ is 8, 9, 10, or 11, the value of $k$ is taken as zero for the first four exponents, as one for the next four exponents, then as two until a zero exponent is obtained; etc.

To illustrate the handling of algebraic expressions containing both positive and negative coefficients consider the equation:

$$5x^3 - 3x^2 - 12x^1 - 4x^0 = 0 \qquad (E)$$

As $n$ is less than 4, $k$ is taken as zero. From the formulas on the arrows in Fig. 14 it is evident that the positive directions for the coefficients (5), (−3), (−12), and (−4) are as shown by the arrows $h$, $i$, $j$, and $m$, respectively. Referring to Figures 14 and 15, place point $q$ a distance from pivot point $p$ measured five units in the direction shown by the arrow $h$. Establish point $u$ three units from point $q$ and in a direction opposite to that shown by arrow $i$ because the coefficient is negative. Place point $s$ twelve units from point $u$ and in a direction opposite to that shown by arrow $j$ because the coefficient of $x^1$ is negative. Place point $t$ four units from point $s$ and in a direction opposite from that shown by arrow $m$ because the coefficient of $x^0$ is negative.

In Fig. 15 tracks $21^f$ and $21^g$ are placed on lines $q$—$u$ and $u$—$s$, respectively. The apparatus is assembled as shown in the figure. The rods $32^a$ and $32^b$ which pass through the corner member $25^n$ are fixed in it and are held rigidly at right angles by the brace 50. The rods are free to slide with respect to all other parts of the apparatus through which they pass. When the respective needles of the pivot blocks $60^a$ and $60^b$ are placed at the points $p$ and $t$, respectively, the apparatus adjusts itself to give one root of the equation. This root (which is −0.40) may be read from the indicating device 71.

In Fig. 15 the slidable parallel brace includes four sliding members 56 instead of two sliding members and two corner members as is shown in Fig. 1. By utilizing the holes in the bars 53 as shown in Fig. 15 a slidable parallel brace is provided which is adapted to function between rods $32^a$ and $32^r$ when they are relatively close together.

Fig. 16 shows the apparatus set with the pivot blocks and the center lines of the track members in the same relative spaced relation as in Fig. 15 and shows a fragment of the rest of the apparatus in a position that it automatically takes to give another root of the equation. In this case the root as read from the circular scale is −1.00.

Fig. 17 is a fragmentary view of the apparatus with the pivot blocks and the center lines of the track members in the same relative spaced relation as in Figures 15 and 16 and shows the only other position that the apparatus will take to give another root of the equation. In this case the apparatus shows the third root of Equation E to be 2.00.

Figures 18, 19, 20:
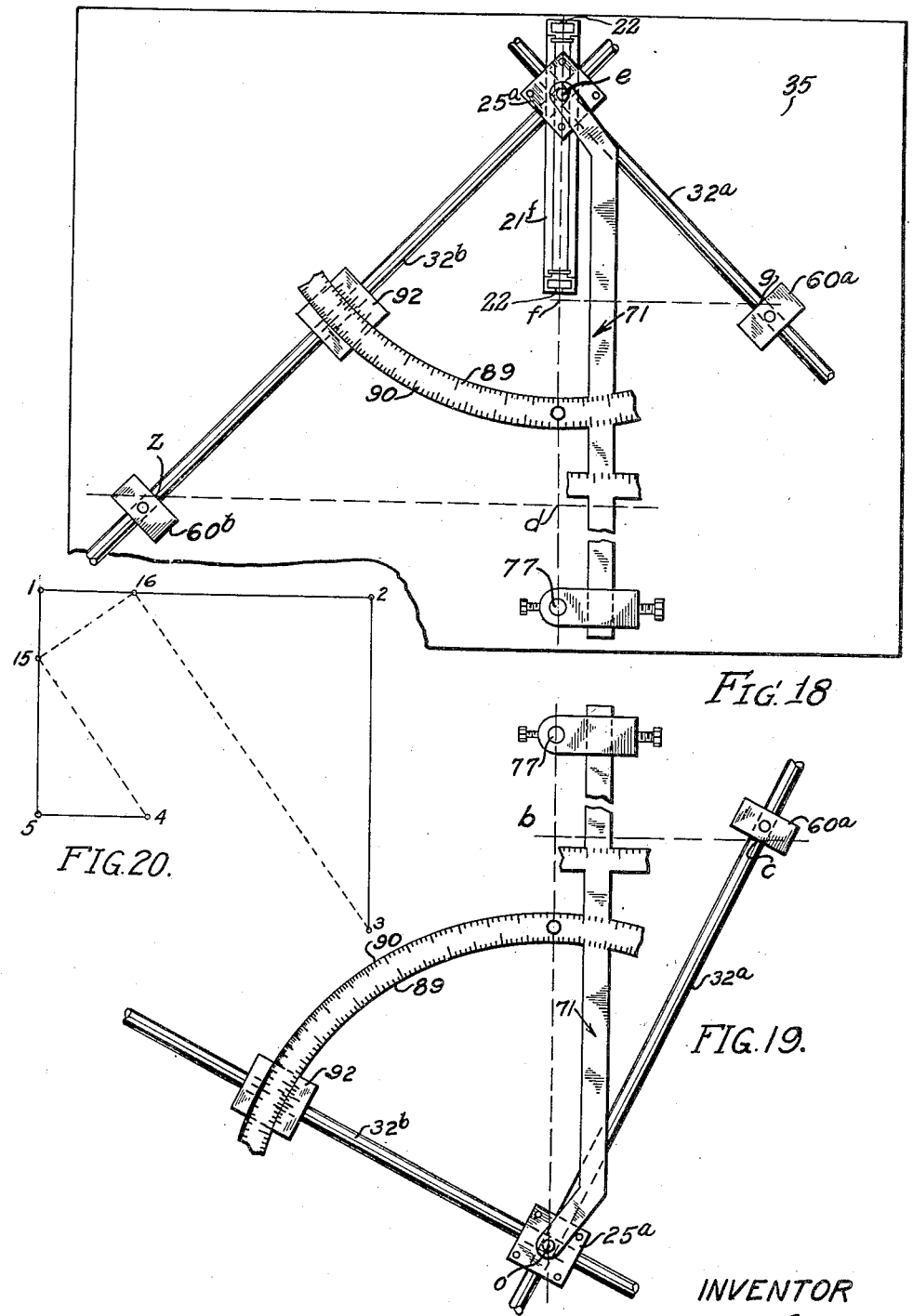

The roots of Equation E obtained from the apparatus may be checked as follows:

Dividing Equation E by $[x-(-.4)]$ to obtain the second degree equation:

$$5x^2 - 5x^1 - 10x^0 = 0 \qquad (F)$$

Dividing Equation F by $[x-(-1)]$ to obtain the first degree equation:

$$5x^1 - 10x^0 = 0 \qquad (G)$$

Equation G shows that $x=2$. Therefore the roots as found by the apparatus are correct.

The results may also be checked by scaling from the apparatus as set in Fig. 15 the values for the proper relative spacing of the pivot blocks and the track for obtaining a root of the equation by the principle described with reference to Fig. 20, and by using the values thus obtained to set the apparatus as illustrated in Fig. 18. In this case, a pivot block $60^a$ is pivoted at point $g$. A track $21^f$ is located with its center line a distance equal to $p$—$q$ from point $g$. In Fig. 18, $g$—$f$ represents this distance from point $g$ to the center line of the track. To guide the reader, Fig. 14 should preferably be oriented with the arrow $h$ extending in the direction $g$—$f$. In Fig. 15 the center of pivot blocks $25^a$ and $25^m$ are represented by points $v$ and $w$, respectively. The other two values to be scaled from Fig. 15 are $v-u$ and $w-s$ and they are both negative quantities as can be seen from their corresponding direction arrows $i$ and $j$, respectively. The rods $32^a$ and $32^b$, the corner member $25^a$ and the indicating device are assembled as before. Another pivot block $60^b$ is slidably mounted on the one of the rods as shown and is brought to a position at a distance from $g-f$ in a direction opposite to that of arrow $i$ and of an amount equal to $v-u$, and at a distance from the center line of the track in a direction opposite to that of arrow $j$ and an amount equal to $w-s$. When thus set, the root of the equation, $-1$, can be read directly from the apparatus. In an analogous manner, the apparatus illustrated in Fig. 19 is set according to measurements taken from the apparatus as shown in Fig. 18. The distance $c-b$ is equal to and corresponds to the distance $g-f$. In Fig. 18 the center of the corner member $25^a$ is represented by point $e$. The center, $o$, of the corner member is at a distance from $c-b$ in a direction opposite to that of arrow $i$ and of an amount equal to $e-d$. The indicating device set as illustrated shows that the remaining root to be checked by this method is 2 as before. Therefore the apparatus may be used to check the solution of equations as well as to solve equations.

The spacing of an element such as a pivot block $60^a$ from a guide such as a track $21^f$ is intended to be the shortest distance between the center line of the guide or track and the point where the element is to be considered as concentrated as the point $g$ where the pivot block $60^a$ is pivoted. The points where pivot blocks $60^a$ and $60^b$ are pivoted and the center of the corner member $25^a$, where the latter is considered as being concentrated, may be considered to be relatively positioned to represent a right angle having the central point of pivot block $25^a$ at the apex of the right angle. The line of motion of a point on a part of my apparatus that is thought of as representing an apex of a right angle as constrained by a track, race, or other guide may be thought of as an equivalent of the center line of the track, race, or guide. As an illustration of the meaning of some of the language herein used, it is stated that "the spacing of an element from a point in a direction parallel to a track" or "the spacing of an element from a point in the direction of a track" is the distance from the element to the intersection of a line through the element parallel to the track with a line through the point perpendicular to the track.

The setting of the aparatus shown in Fig. 18 has been described and illustrates the use of my invention in solving equations of the second degree of the general form $$a_0x^2+a_1x+a_2=0$$

The portion of the apparatus of Fig. 18 that is comprised solely of track $21^f$, corner member $25^a$, rods $32^a$ and $32^b$, and pivot blocks $60^a$ and $60^b$ constitutes a complete working unit of apparatus for use in solving second degree equations. The track $21$, together with the sheet of material or other support that provides the base $35$ with which the track is fixed, may be named a "fixed element." Consider that the fixed element is provided with a guide such as a line at $f$ perpendicular to the center line of the track. The spacing along the guide of the point $g$ (where the pivot point of the pivot block $60^a$ is punched into the sheet or other support) from the center line of track $21$ represents the value of $a_0$. The spacing of the two pivot blocks in the direction of the track $21$ represents the value of $a_1$ and the spacing of the pivot block $60^b$ from the center line of track $21$ represents the value of $a_2$ of the equation, the direction of application of said spacings for representing the proper algebraic values of $a_1$ and $a_2$ being assumed to be in accordance with the rules as set forth elsewhere hereinbefore. The rod $32^a$ is movable with respect to the before named fixed element, which rod, together with the pivot block $60^a$, may be called a relatively movable element a function of whose angular relationship with respect to said fixed element represents a value of the "$x$" term of the equation. The pivot block $60^b$, the corner member $25^a$ together with its means for slidably engaging with track $21^f$, and the rod $32^b$ constitute means for determining the position of the aforementioned movable element so that a function of the angular relationship thereof with respect to said fixed element will represent a value of the "$x$" term of the equation for any given values of the "$a$" terms within the limits for which the apparatus is constructed. In this case the function referred to as representing the value of $x$ is the cotangent of the angle between said movable means and said fixed element, that is, between the rod $32^a$ and the track. If we consider that the fixed element is provided with a representation of the center line of the track extending through and beyond points $e$ and $f$ and is provided with the aforementioned guide perpendicular to said center line at $f$, these portions of the fixed element extending in the directions of $f-e$ and $f-g$ are scales whether or not the same are provided with graduations or indicia, for the experienced operator will estimate the relative scalar relation of the distances of $f-e$ and $f-g$, which, when considered as a proportion or ratio is the value of $x$. An experienced operator can estimate the relation between these dimensions almost to two place accuracy when one of the dimensions is not too small with respect to the other. When the apparatus is set for a given equation and the ratio is found to be small or large so that the estimation thereof is difficult, the ratio is nevertheless estimated to the best of the ability of the operator and the ratio thus obtained is assumed to be the value of $x$ while a transformation of coordinates is made algebraically to obtain a new equation having a value of $x$ of unity. The apparatus is set for the new equation and a new ratio estimated. The more accurate value of $x$ of the original equation will be above or below the ratio first obtained by the amount that the last estimated ratio is above or below unity. Without the use of any graduations or indicia, whatsoever, the operator can observe the relation to the best of his ability and then conveniently and quickly improve on the value of $x$ thus obtained by taking a series of mean values by known methods to obtain the value of $x$ to any desired number of decimal places. The apparatus comprised solely of the hereinbefore named fixed element, the two rods, and the corner member constitutes a complete and useful unit of apparatus. Such terms as used herein in naming portion of the apparatus are not to be limited to the described construction, but are intended to apply to any and all equivalents.

If both sides of any second degree equation of the general form having a value of $a_0$ other than unity be divided by $a_0$, the equation will be placed in the form $$x^2 + ax + b = 0$$

where $a$ and $b$ are constants. The apparatus of Fig. 18 may be considered to be set for an equation of this form if the distance $f$—$g$ be considered to be unity. The respective spacings of the portions of the apparatus that represents $a$ and $b$ are the same as those that have been described in the preceding paragraph as representing $a_1$ and $a_2$, respectively. The component of the distance between the point $e$ and the point $g$ measured in the direction of the track $21^t$ is a value of one root of the equation. For the type of equation now being considered, the spacing, in the direction of the track $21^t$, of the corner member $25^a$ and pivot block $60^b$ represents a value of the other root of the equation. This can be seen from the construction of Fig. 19, in which the spacing just mentioned is applied where it must represent a value of $x$ because $b$—$c$ is made equal to $f$—$g$ which in this case is unity.

Still referring to Fig. 18, consider a still simpler, but complete combination of apparatus for solving equations of the type described in the preceding paragraph. Consider the two rods as being fixed in the corner member to provide with the corner member one structure and the fixed element comprised of the track and the support as the only other structure. This eliminates both pivot blocks as well as the indicating device, the latter of which was not included in the structure described in the preceding paragraph. The rods are manually or otherwise brought to a position so that each of the rods extends over a respective point such as those that determine the positions of the pivot blocks in the methods previously described, whereupon, the position of the rods with respect to the fixed element indicates to a skilled operator the value of $x$.

To place the equation $x^2 + ax + b = 0$ in a form having a value of unity as the value of the "$a$" term, substitute $$x' + \frac{1-a}{2}$$

for $x$. If a value of $-1$ be desired as the value of the "$a$" term, substitute $$x' + \frac{a-1}{2}$$

for $x$. By the methods described, any second degree equation can be reduced to the form $$x^2 \pm x = a$$

where $a$ is a constant. The apparatus shown in Fig. 18 may be considered to be set for an equation of the form $$x^2 - x = a$$

In this case it is convenient to have the fixed element provided with a guide such as a line $z$—$d$ parallel to $f$—$g$ and at a distance of one unit from $f$—$g$. The rod $32^b$ of the "means for determining the position of the movable element" is placed so as to cross said guide (line $z$—$d$) at a distance from $d$ that represents the value of the "$a$" term, then the distances $f$—$e$ and $d$—$e$ represent values of the unknowns of the equation. A convenient and relatively complete unit of apparatus for solving second degree equations may consist of just three structures, namely, (1) the fixed element; (2) the pivot block $60^a$ and the rod $32^a$ which will now be considered as fixed in the pivot block; and (3) the other rod $32^b$ and the corner member $25_a$ which will be considered as fixed on rod $32^b$. When the last mentioned rod is moved so as to cross said guide at various spacings from point $d$, the corner member on the end of the rod slides along the fixed element and constrains the relative motion between the other rod and itself to translation in a direction perpendicular to itself. The foregoing description is intended to make it very clear that a very simple means may be employed for determining the position of the movable element for any given value of the "$a$" term between predetermined limits.

Consider the apparatus of Fig. 18, disregarding the indicating device and considering the lines determined by $g$—$f$ and $d$—$z$ and $d$—$f$ as a useful portion of the fixed element. Such apparatus is an adjustable figure for representing any of a series of pairs of right triangles. The rods $32^a$ and $32^b$ represent the respective hypotenuses of said triangles. The corner member $25^a$ maintains the rods at $90°$ relatively. The track $21^t$ may be fixed at any position in alinement with $d$—$f$, within the limits of the supporting surface on which the lines are provided. The center line of the track $21^t$, the line $d$—$f$, the line $d$—$e$, and any other line in alinement with the same are considered as one and the same line, and such line represents the direction of a leg of both triangles. The track $21^t$, together with the slidable connection between the track and the corner member $25^a$, constrain the intersection of rods $32^a$ and $32^b$ to such movement as is thought of as being along the center line of track $21^t$. The corner member $25^a$, rods $32^a$ and $32^b$, and track $21^t$ are elements of a means for maintaining the sum of the adjacent angles of the two triangles equal to a right angle, and therefore constitute means for maintaining the triangular figures similar. Said means also provides the operative connection between the triangular figures.

When distances $d$—$f$ and $f$—$g$ are unity and the apparatus is adjusted to make distance $d$—$z$ represent any given value of the "$a$" term, within the limits for which the apparatus is constructed, the leg, $f$—$e$, of one of the triangles will represent in dimension a value of the root of the equation of the form $$x^2 - x = a$$

In accordance with the hereinbefore stated rules, such a value of the root is a negative quantity when $a$ is positive. The value of the other root for the same case is represented by the leg $d$—$e$ of the other figure and is a positive quantity. When pivot block $60^b$ is moved past point $d$ along the prolongation of line $z$—$d$ for representing a minus value of $a$, then the point of intersection of the rods will be on the other side of point $f$ and the dimension of the leg $f$—$e$ will represent a positive quantity as one value of $x$ and the leg $d$—$e$ of the other figure will represent the other value of $x$ which is also a positive quantity.

The equation of the form $$x^2 + x = a$$

can be solved by use of the adjustable triangular figure of Fig. 18 in accordance with the theory set forth in the preceding paragraph except that the application of the algebraic value of the coefficient of the "$x$" term which is unity in this case, be considered to be applied in an opposite direction; and that the rules be reversed as to whether or not the values of $x$ are positive or negative quantities. From the foregoing it follows that the automatically-maintained similar, adjustable, triangular structures of Fig. 18 are adapted for use in solving both cases of an equation of the general form $$x^2 \pm x = a$$

It was stated with reference to Fig. 13 that for some problems it is more convenient to start with point 14. If it is desired to use the coefficient of the zero power of $x$ first, the directions in which to apply the spacings corresponding to the different powers of $x$ should be apparent from the foregoing description. However, when starting with the coefficient of the lowest power of $x$ and proceeding with the application of the values of the coefficients of ascending powers of $x$, the procedure is the reverse of the procedure for which Fig. 14 is intended as a guide. In this case, to obtain the same relative positioning of the parts of the apparatus, the values of the coefficients are preferably applied in opposite relative directions than indicated by the arrows of Fig. 14. When starting with the coefficient of $x^0$, a set of preferred steps in determining one root of any third degree equation include pivoting a pivot block at a pivot point, setting a track so that its center line is spaced from the pivot point a distance corresponding to the exponent of $x^0$ and in a direction opposite to arrow $h$ of Fig. 14, placing a corner member on the track, extending a rod slidably through the corner member and the pivot block, setting a second track with its center line parallel to arrow $j$ and spaced from the pivot point a distance corresponding to the exponent of $x^1$ and in a direction opposite to arrow $h$ of Fig. 14, placing a corner member on the track, extending a rod slidably through the corner member and the pivot block, setting a second track with its center line parallel to arrow $j$ and spaced from the pivot point a distance corresponding to the exponent of $x^1$ and in a direction opposite to arrow $i$, placing a second corner member on this last mentioned track, extending a second rod slidably through both corner members and perpendicular to the first mentioned rod, extending a third rod through said second corner member and perpendicular to said second rod, shifting the apparatus by moving said third rod so that the axis thereof passes directly over a point located a distance from the first mentioned track corresponding to the coefficient of $x^3$ and in a direction opposite to that of arrow $j$ and said point being located a distance from said second track corresponding to the exponent of $x^3$ and in a direction opposite to that shown by arrow $m$, and measuring the tangent of the angle between the portion of the rod that passes through the pivot block and the center line of the first mentioned track, or the equivalent of these steps.

Throughout this specification and nearly all literature pertaining to mathematics it is implied that negative quantities be applied negatively.

In proceeding with the setting of the apparatus by using the coefficients of $x$ in the order of the ascending powers of $x$ or by using the coefficients of $x$ in the order of the descending powers of $x$, it is important to note that for any one equation the constant term and the coefficients of the even powers of $x$ are all applied in parallel and alternately opposite directions. These coefficients of the even powers of $x$ determine the spacing of the track lines and pivot points that correspond to the odd powers of $x$.

The coefficients of the odd powers of $x$ are all applied perpendicular to the even powers of $x$ and every other coefficient of the odd powers of $x$ are applied in opposite directions. When proceeding with the coefficients of $x$ in the order of descending powers of $x$, each coefficient is applied in a direction perpendicular to and clockwise to the direction of application of the coefficient of the preceding power of $x$. When proceeding with the application of the coefficients in ascending powers of $x$, each coefficient is applied perpendicular to and counter-clockwise with respect to the direction of application of the coefficient of the preceding power of $x$.

The relative position of the settings of the apparatus corresponding to any two terms of an equation may be determined by taking the summation of the proper application of the coefficients of the odd powers of $x$ between the two terms in question and applying the same in one direction and by taking the summation of the proper application of the coefficients of the even powers of $x$ between the two terms in question and properly applying the same in a direction perpendicular to said one direction.

Each projection 26 fitting over a ball bearing 27 on track 21 provides means for setting the apparatus so that a vertex of one of the right angles of the adjustable figure may be moved along a certain line parallel to a plane. Many other means may be employed for performing this same function. Many different types of tracks could be used and many different types of bodies for sliding or rolling along the tracks.

The apparatus described is adapted to adjust itself so that certain elements are spaced a distance equal to the value of the polynomial when certain other portions of the apparatus are set spaced distances equal to the coefficients of each power of the variable and other elements of said apparatus are set a distance apart equal to the value of the variable of said polynomial, all of said distances being to the same scale.

The apparatus described is also adapted to adjust itself so that certain elements are spaced a distance equal to one root of an equation when portions of the apparatus are set apart distances equal to the coefficients of each power of the unknown in said equation, all of said distances being to the same scale. It is also provided with a device from which said root may be read directly.

Referring to Fig. 15, the pivot block 60$^b$ at $t$, the portion of the corner member 25$^m$ engaged with track 21$^g$, the portion of the corner member 26$^a$ engaged with the other track 21$^t$, and the pivot block 60$^a$ at $p$ may be termed a series of devices including as a first device, the pivot block 60$^b$ at $t$; as a last device, the pivot block 60$^a$ at $p$; and as intermediate devices, the aforementioned portions of the corner members 25$^m$ and 25$^a$, respectively.

The rods 32, brace 50, sliding members 56 and bars 53, with or without the portion of corner members 25$^m$ and 25$^a$ that actually connect the rods, comprise an adjustable framework having connections between successive devices of the just mentioned series. Said framework is adapted for simultaneously moving the devices and, at the same time, constraining the same for holding each three of said successive devices relatively positioned to represent a right angle having the device intermediate of the three at the apex of the right angle. Said framework has connection with the indicating elements 92 and 83 for simultaneously moving the elements and, at the same time, alining them with a pair of said successive devices.

Either of pivot blocks 60ª and 60ᵇ or a corner member assembled with a pivot attachment 97 or 100 may be termed a pivotal means, which term is to apply to any portion of apparatus that is for use in holding an element of the apparatus at any point such as any one of those points where the hereinbefore described pivotal means are intended to be used in solving mathematical problems.

The tracks 21 may be referred to as mountings. In the case where a mounting 21 is not used and a vertical edge or a mark 99 of an attachment 95 assembled with a corner member 25 is manually confined to a rectilinear path, the device comprised of the corner member and the attachment 95, or any device for use in confining a point in an apparatus to a rectilinear path for the purpose described, is called a shiftable means or a shiftable device.

A corner member 25 may be termed a rod-connecting member or a connector. It may be considered to include the projection 26, or the portion of the corner member 25 that actually connects the rods may be referred to as a rod-connecting member or connector and the rest of the corner member described as a bearing for the rod-connecting member or connector mounting or supporting it for movement along one of the tracks. This bearing and the engagement thereof with the track may be described as a pivotal connection. A corner member 25 engaged with one of the tracks provides a linearly movable device or a slidable device.

The foregoing is to be considered as illustrative of, rather than limitative upon, the scope of the meaning of the terms used in the appended claims.

Although I have herein shown and described only one form of apparatus for solving mathematical problems and have shown a few variations of use thereof wherein parts of said apparatus are unused for certain usage, it is to be understood that various changes and modifications may be made without departing from the spirit of my invention and the spirit and scope of the appended claims.

I claim:

1. In apparatus for use in solving mathematical problems, a pair of linear rods, linearly movable means in which the rods are mounted for rectilinear longitudinal movement at right angles to each other, and devices having connection with the respective rods and each movable linearly relatively to its respective rod and provided with a marker for being set at selected positions with respect to the other and with respect to the line of motion of said means, said rods and said means being adapted to indicate the angular position of the rods with respect to the line of motion of said means, a property of which angular position is an indication of a term of a problem having as the terms thereof those that are represented by dimensions that determine the positions at which the markers are set.

2. In apparatus for use in solving algebraic equations of the general form $$x^2 \pm x = a$$

a fixed element and a relatively movable element whose position with reference to the fixed element denotes a value of $x$ of the equation, and means for determining the position of said movable element for any given value of the "$a$" term between predetermined limits, said means including a member connected with the movable element and a guide intersected by the member and having a predetermined point, the distance from which along the guide to the intersection of the member therewith dimensionally represents the value of $a$.

3. In apparatus for use in solving algebraic problems, a graduated scale, an arm fixed with respect to the scale and disposed substantially at right angles to the scale, a combination of a plurality of relatively movable members having a definitely constraining type of joinder between adjacent members thereof adapted to transmit motion from one member to the other and to constrain the same in accordance with a predetermined definite relation of motion, a pivotal connection between one of said movable members and said arm, said pivotal connection having its axis in perpendicular alinement with the zero marking of said scale, said one of said members being adapted to cross said scale, the portion of the member between the intersection thereof with said scale and said axis and the portion of said scale between the zero marking thereof and the aforementioned intersection being adapted to represent the hypotenuse and one leg, respectively, of any of a series of right triangles having said zero marking and said axis determining the other leg thereof, and an index element on said one of said movable members which is adapted to register with said scale.

4. In apparatus for use in solving algebraic problems, a graduated scale, an arm disposed substantially at right angles to the scale, a combination of a plurality of relatively movable members having a definitely constraining type of joinder between adjacent members thereof adapted to transmit motion from one member to the other and to constrain the same in accordance with a predetermined definite relation of motion, a pivotal connection between one of said movable member and said arm, said pivotal connection having its axis at a predetermined distance from said scale, said one of said movable members and said scale being adapted to represent the hypotenuse and one leg, respectively, of any of a series of right triangles having the aforementioned distance as the other leg thereof, and an index means engaged with said scale for indicating the length of the first mentioned leg of any of said series of triangles.

5. In apparatus for use in solving algebraic problems, a graduated scale, an arm disposed substantially at right angles to the scale, a plurality of relatively movable members having a joinder between adjacent members thereof adapted to transmit motion from one to the other and to constrain the same in accordance with a predetermined relation of motion, a connection between one of said movable members and said arm, said connection being adapted for movement of the member in the direction of the length thereof and for rotation of the member about a perpendicular axis, said axis being at a predetermined distance from said scale, said one of said movable members and said scale being adapted to represent the hypotenuse and one leg, respectively, of any of a series of right triangles having the aforementioned distance as the other leg thereof, and an index means engaged with said scale for indicating the length of the leg represented by the scale.

6. In apparatus for use in solving algebraic problems, embodying a binomial of the form $a_0x+a_1$, an instrument having a graduated scale; a movable, rectilinear member; a pivotal connection between said member and the instrument, said pivotal connection having its axis at a distance from said scale equal to one unit of measure on said scale; means for determining the direction of said member with respect to the instrument for any given values of $a_0$ and $a_1$ within predetermined limits, comprising a device whose spacing from said axis in a direction perpendicular to said scale represents a value of $a_0$ and whose spacing from said axis in the direction of said scale represents a value of $a_1$, said device being on said member and being movable in the direction of said member; and an index means having connection with said member and said scale for indicating on said scale the length of one leg of any of a series of right triangles having the aforementioned distance as the other leg thereof and having the direction of said member as the direction of the hypotenuse thereof.

7. In apparatus for use in solving mathematical problems embodying a polynomial of the general form $$a_0x^n+a_1x^{n-1}+a_2x^{n-2}$$

a rectilinear guideway, a shiftable device whose spacing from said guideway represents a value of $a_0$, a movable device engaged with the guideway whose spacing from said shiftable device in the direction of the guideway represents $a_0x$, a second shiftable device whose spacing from the guideway represents a value of $a_2$ and whose spacing from the first named shiftable device in the direction of the guideway represents $a_1$, and means for determining the positions of the aforementioned devices for all values of $x$ and the "$a$" terms, within predetermined limits, so that the values of $a_0x$, $a_1$, and $a_2$ may be obtained by measurement of the spacings that represent the same, said means being adapted for holding the devices relative to each other for representing a right angle whose apex is at the aforenamed movable device along the guideway.

8. In apparatus for use in solving mathematical problems, a base; a plurality of rectilinear guides on the base arranged in mutually perpendicular positions, a series of devices including a first device, a last device and intermediate devices, the first device and last device being shiftable with respect to each other on the base, the first device being provided with a marker for being set at selected positions with respect to the last device, the last device being provided with a marker for being set at selected positions with respect to the first device, one of the intermediate devices being mounted on each of the guides for rectilinear movement therealong; an adjustable framework having connections between successive devices in the series and adapted for simultaneously moving the devices and, at the same time, constraining the same for holding each three of said successive devices relatively positioned to represent a right angle having the device intermediate of the three at the apex of the right angle; and an instrument having connection with the base and the devices and the framework for indicating a function of the angular relationship between the directional arrangement of the devices and the guides.

9. In apparatus for use in solving mathematical problems, a base; a plurality of rectilinear guides on the base arranged in mutually perpendicular positions; a series of devices including a first device, a last device and intermediate devices, the first device and last device being shiftable with respect to each other on the base, the first device being provided with a marker for being set at selected positions with respect to the last device, the last device being provided with a marker for being set at selected positions with respect to the first device, one of the intermediate devices being mounted on each of the guides for rectilinear movement therealong; and an adjustable framework having connections between successive devices in the series and adapted for simultaneously moving the devices and, at the same time, constraining the same for holding each three of said successive devices relatively positioned to represent a right angle having the device intermediate of the three at the apex of the right angle for positioning the devices in a definite directional relationship with respect to the guides corresponding to any setting of the first device and the last device with respect to the guides, whereby some of the devices and one of the guides are relatively positioned so that a property of their relative position is an indication of a result of a problem having terms that are represented by dimensions that determine the positions at which the first and the last device are set with respect to the guides.

10. In apparatus for use in solving mathematical problems, a base having a plurality of perpendicularly related guides; a series of devices including a first device, a last device and intermediate devices, the first device and last device being shiftable with respect to each other on the base, one of the intermediate devices being mounted on each of the guides for rectilinear movement therealong; and an adjustable framework having connections between successive devices in the series and adapted for simultaneously moving the devices, and, at the same time, constraining the same for holding each three of said successive devices relatively positioned to represent a right angle having the device intermediate of the three at the apex of the right angle for relatively positioning the devices for indicating a definite directional relationship with respect to the guides corresponding to any setting of the first device and the last device with respect to the guides.

11. In apparatus for use in solving algebraic equations of the form $$a_0x^2+a_1x+a_2=0$$

a base having a rectilinear track; a relatively movable element for placement at an angle with the track whose cotangent represents a value of $x$; a device on the element adapted to be set for supporting the element for rotation about an axis perpendicular with respect to both the element and the track and located at a point whose distance from the track represents a value of $a_0$, and said device being adapted to provide for longitudinal motion of the element with respect thereto; a straight member for being set so as to extend through a position whose spacing from the track represents a value of $a_2$ and whose spacing from said point in a direction parallel to the track represents a value of $a_1$; a connector between the element and the member adapted to maintain the same at ninety degrees relative to each other and to provide for freedom of longitudinal movement of the member therein; and a bearing for the connector mounting it for movement along the track; whereby the element is positioned with respect to the track at an angle whose cotangent represents a value of $x$ corresponding to any given set of values, within predetermined limits, of the "a" terms of the equation for which the element and the member are set.

12. In apparatus for use in solving mathematical problems, a base having a plurality of perpendicularly related guides; a series of devices including a first device, a last device and intermediate devices, the first device and last device being shiftable with respect to each other on the base, one of the intermediate devices being mounted on each of the guides for rectilinear movement therealong; an indicating device including a straightedge, a protractor, and an indicating element on each of the latter, said indicating device having connection with the base and one of the devices for holding the straightedge parallel to one of the guides; and an adjustable framework having connections between successive devices in the series and adapted for simultaneously moving the devices and, at the same time, constraining the same for holding each three of said successive devices relatively positioned to represent a right angle having the device intermediate of the three at the apex of the right angle, said framework having connection with the indicating elements for simultaneously moving said elements and, at the same time, alining said elements with a pair of said successive devices.

13. In apparatus for use in solving algebraic equations of the form $$a_0x^2 + a_1x + a_2 = 0$$

a base having a rectilinear track, a rectilinear element for being set so as to extend through a point whose distance from the track represents a value of $a_0$, a straight member for being set so as to extend through a position whose spacing from the track represents a value of $a_2$ and whose spacing from said point in a direction parallel to the track represents a value of $a_1$, a connector between the element and the member adapted to maintain the same at ninety degrees relative to each other, and a bearing for the connector mounting it for movement along the track, whereby the element is positioned with respect to the track at an angle whose cotangent presents a value of $x$ corresponding to any given set of values, within predetermined limits, of the "a" terms of the equation for which the element and the member are set.

14. In apparatus for use in solving mathematical problems, a base; two adjustable pivotal means on the base; adustable mountings on the base, each mounting having a rectilinear guideway; a series of rods having the first rod thereof connected with one of the pivotal means and having the last rod thereof connected with the other one of the pivotal means; rod-connecting members respectively and slidably connecting the rods of said series and each of said members being adapted to maintain the rods connected thereby at right angles to each other; connections between said members and the mountings, respectively, and each of said connections being adapted for movement linearly of the guideway of the respective mounting; and an instrument having connection with one of the rods and the base for indicating a function of the angular relationship between the rod and the guideway of one of the mountings.

15. In apparatus for use in solving algebraic equations of the form $$a_0x^2 + a_1x + a_2 = 0$$

a base having a rectilinear track, a relatively movable element adapted to intersect the track and to be pivotally set at a point whose distance from the track represents a value of $a_0$, a straight member for being set so as to extend through a position whose spacing from the track represents a value of $a_2$ and whose spacing from said point in a direction parallel to the track represents a value of $a_1$, a connector between the element and the member adapted to maintain the same at ninety degrees relative to each other, and to provide for freedom of longitudinal movement of the element therein and a bearing for the connector mounting it for movement along the track, whereby the element is positioned with respect to the track at an angle whose cotangent presents a value of $x$ corresponding to any given set of values, within predetermined limits, of the "a" terms of the equation for which the element and the member are set.

16. In apparatus for use in solving algebraic equations, a base having a rectilinear guide; a pair of straight computing members held at right angles to each other; a pivotal connection between the members and the guide at the apex of the right angle, said connection being slidable with respect to the guide; a second rectilinear guide on the base positioned at right angles to the first named guide and intersected by one of said members; and a third rectilinear guide on the base positioned at right angles to the second guide and intersected by the other of said members.

17. In apparatus for use in solving algebraic equations, a base having a rectilinear guide; a pair of straight members held at right angles to each other; a pivotal connection between the members and the guide at the apex of the right angles, said connection being slidable with respect to the guide; a second rectilinear guide on the base positioned at right angles to the first named guide and intersected by one of said members; and a rectilinear scale having graduations and positioned at right angles to the first guide and intersected by the other member; and an index device connected with the scale and said other member, said device being adapted to provide for freedom of longitudinal motion of said scale with respect thereto, and said device being adapted to register with graduations on said scale for indicating the distance from the first guide to the intersection of the scale with the last mentioned member.

18. In apparatus for use in solving algebraic problems of degree higher than one, a base having a first, a second, and a third rectilinear guide, the first and third thereof being perpendicular to the second guide; and an adjustable right-angled frame comprising a pair of straight members relatively positioned to represent the sides of a right angle, a connector engaged with one of the members and the first guide, a bearing for said connector mounting it for movement along the guide, a second connector between the members and the second guide at the apex of the right-angle, and a bearing for the second connector mounting it for movement along the second guide, a third connector between the other of the members and the third guide, and a bearing for the third connector mounting it for movement along the third guide; said frame having slidable connections between the members and certain of the connectors for facilitating movement of the members to positions to represent the sides of any of a series of right-angles having the apex thereof along the second guide and said frame being adapted to maintain the members at right angles during movement thereof, whereby, for any one of the positions of the frame with respect to the guides, the spacing of the first named connector from the second guide, the spacing of the third connector from the first connector in a direction parallel to the second guide, the spacing of the third connector from the second guide, the ratio of the spacing of the second connector from the first guide to the spacing of the first connector from the second guide are in the relationship of values of the numerical coefficients, the constant term, and the value of $x$, respectively, of an equation in the general form of the second degree.

19. In apparatus for use in solving algebraic problems of degree higher than one, a base having a first, a second, and a third rectilinear guide, the first and third thereof being perpendicular to the second guide; and a straight member intersecting the first and second guides; a first device adapted for movement along the first guide and for supporting the member for rotation about an axis perpendicular with respect to both the member and the guide and located at the intersection of the member with the guide; a second straight member positioned at a right angle with respect to the first named member and intersecting the third guide; a second device holding the second member at right angles to the first member and supporting the members for rotation about an axis through the apex of the right angle and perpendicular with respect to both of the members and located at the second guide, said second device being adapted for movement of said axis along the second guide; a third device adapted for movement along the third guide and for supporting the first member for rotation about an axis perpendicular with respect to the member and the guide and located at the intersection of the member with the third guide; and means for indicating a function of the angular position, with respect to the guides, of the portion of the apparatus comprised of the devices and the members, said portion of the apparatus having slidable connections between the members and certain of the devices for faciltating movement thereof to any of a series of positions with respect to the guides, within limits 20. In apparatus for use in solving algebraic problems, a base having a straight race and a rectilinear guide at right angles to the race; a first device movable along the guide, the spacing of which device from the race represents a value of $a_0$ in an equation of the form $$a_0x^2 + a_1x + a_2 = 0$$

a second device movable along the race, the spacing of which second device from the guide represents a value of the product of $a_0$ and $x$ of said equation; a track adapted to be set at any of a number of spacings from the guide and for being set parallel to the guide, the spacing of which track from the guide represents a value of $a_1$ of said equation; a third device movable along the track, the spacing of which third device from the race represents a value of $a_2$ of said equation; means for transmitting motion between the devices and for constraining the same so that, for any spacing of the track with respect to the guide for a value of $a_1$ and of any two of said devices for values of two of the terms, $a_0$, $a_0x$, and $a_2$, the other device will automatically take a position so that the spacing thereof will represent a value of the other one of said terms, said means including straight members for interconnecting the devices and a connection between the members adapted to maintain the same at ninety degrees with respect to each other, and said means having slidable connections with certain of the devices for facilitating the transmitting and constraining of motion between the devices.

21. In apparatus for use in solving algebraic equations of the form $$a_0x^2 + a_1x + a_2 = 0$$

a base having a straight race and a rectilinear guide at right angles to the race; a first device movable along the guide, the spacing of which device from the race represents a value of $a_0$; a second device movable along the race; a track adapted to be set at any of a number of spacings from the guide and for being set parallel to the guide, the spacing of which track from the guide represents a value of $a_1$; a third device movable along the track, the spacing of which third device from the race represents a value of $a_2$; and means connected with the devices for transmitting motion between the devices and for constraining the same for holding the second device at the apex of a right angle whose sides include the first and third device, respectively, for any spacing of the track with respect to the guide and for any spacing of the first and third device along the guide and the track, respectively, whereby the devices represent a right angle whose apex is at the position of the second device along the race and whose sides are at an angle with the race, a function of which is a value of $x$ of an equation having as values of the "$a$" terms thereof said spacings.

22. In apparatus for use in solving algebraic equations of the form $$x^2 + ax + b = 0$$

a base having a rectilinear guide; a straight member intersecting the guide and being supported for rotation about an axis at a distance of one unit from the guide, said axis being perpendicular to the member and the guide; an indicating element connected with the member and adapted for movement along the guide; a track at right angles to the guide, the spacing of which with respect to said axis in the direction of the guide represents a value of $a$; a device for movement along the track, the spacing of which from the guide represents a value of $b$; a straight member for connecting the device with the indicating element; and means for maintaining the aforementioned members at right angles to each other so that, for any spacing of the device with respect to the race, the spacing of the indicating element from said axis in a direction parallel to the race indicates a value of $x$ in an equation having as values of $a$ and $b$ thereof the spacings that represent the same.

23. In apparatus for use in solving algebraic equations of the form $$x^2 + ax + b = 0$$

a base having a straight race; a first device supported on the base for rotation about an axis at a distance of one unit from the race; a second device movable along the race; a straight track adapted to be set at any of a number of spacings from the first device and for being set at ninety degrees with respect to the race, the spacing of which track from the first device represents a value of $a$; a third device movable along the track, the spacing of which third device from the race represents a value of $b$; and means connecting the devices for transmitting motion between the devices and for constraining the same for holding the second device at the apex of a right angle whose sides each include one of the other devices, for any said spacings, so that the devices represent a right angle whose apex is at the position of the second devce along the race and the spacing of the second device from the first device in a direction parallel to the race indicates a value of $x$ in an equation having as values of $a$ and $b$ thereof the spacings that represent the same.

24. In apparatus for solving mathematical problems, a base having a straight race; a movable element, a property of whose angular position with respect to the race is an indication of a value of an unknown of an equation, the element having a rectilinear guide, the base and the movable element having a pivotal connection at a predetermined distance from the race and movable linearly of the guide, the base and the element having a second pivotal connection positioned in alinement with the guide and movable linearly of the race, said element adapted for being set so that certain dimensions of the position thereof with respect to the race and the first named connection represent values of numerical terms of the equation.

25. In apparatus for use in solving algebraic equations of the form $$a_0x^n + a_1x^{n-1} + a_2x^{n-2} + \ldots + a_{n-2}x^2 + a_{n-1}x + a_n = 0$$

a series of rectilinear elements relatively disposed to represent the sides and hypotenuses of a series of adjustable right triangular frames; means for simultaneously moving an element of each of the frames and for maintaining a constant relative directional relationship between the elements for maintaining the frames similar, the first frame of said series having a side at an angle with its hypotenuse whose tangent represents a value of $x$, said side being for representing a value of $a_0$, a corresponding side of each successive one of the rest of the respective frames having dimensionally represented therealong a value of one of the rest of the "$a$" terms except $a_n$, said means being adapted for transmitting motion between the frames for maintaining the corresponding side of the second frame of a length to represent the sum of the representation of $a_1$ and the dimension of the other side of the first frame, said means being similarly adapted for transmitting motion between the frames for maintaining the corresponding side of the third frame of a length to represent the sum of the representation of $a_2$ and the dimension of the other side of the second frame, said means being similarly adapted for transmitting motion between the frames for maintaining the corresponding side of each of the frames of a length to represent the sum of the representation of the value of the numerical coefficient dimensionally represented therealong and the dimension of the other side of the preceding frame, whereby the corresponding side of the last frame represents $$a_0x^{n-1} + a_1x^{n-2} + a_2x^{n-3} + \ldots + a_{n-2}x + a_{n-1}$$

and the other side of the last frame represents a value of $a_n$.

NEAL GARRETT.